United States Patent [19]
Ehlers

[11] Patent Number: 5,241,514
[45] Date of Patent: Aug. 31, 1993

[54] IDENTIFYING, CHARACTERIZING, AND MAPPING OF SEISMIC NOISE

[75] Inventor: Jerry W. Ehlers, Tulsa, Okla.

[73] Assignee: Amoco Corporation, Chicago, Ill.

[21] Appl. No.: 879,667

[22] Filed: May 6, 1992

[51] Int. Cl.⁵ .............................................. G01V 1/36
[52] U.S. Cl. ......................................... 367/61; 367/38
[58] Field of Search ...................... 367/38, 61, 21, 43; 364/421

[56] References Cited

U.S. PATENT DOCUMENTS

| | | | |
|---|---|---|---|
| 3,597,727 | 8/1971 | Judson et al. | 367/61 |
| 3,689,873 | 9/1972 | Weller | 367/61 |
| 3,766,519 | 10/1973 | Stephenson | 367/61 |
| 3,806,863 | 4/1974 | Tilley et al. | 367/61 |

OTHER PUBLICATIONS

Carl Regone, "Identifying, Quantifying, and Suppressing Backscattered Seismic Noise," May 10, 1991, Permian Basin Geophysical Society 33rd Annual Exploration Meeting, pp. 20-21.

*Primary Examiner*—Ian J. Lobo
*Attorney, Agent, or Firm*—James A. Gabala; Richard A. Kretchmer; Frank J. Sroka

[57] ABSTRACT

The present invention provides novel methods for identifying, characterizing and mapping seismic noise as an aid in evaluating and enhancing seismic data. In particular, an array of seismic receivers can be beam steered to sense seismic energy arriving from a plurality of azimuths. A measure of the strength of the seismic energy for each azimuth can be obtained for a plurality of arrival times, velocities and distances from the array. Displays of the azimuthal distribution of the strength of the seismic energy sensed by the areal array can then be produced for identifying and characterizing seismic noise into seismic data.

19 Claims, 10 Drawing Sheets

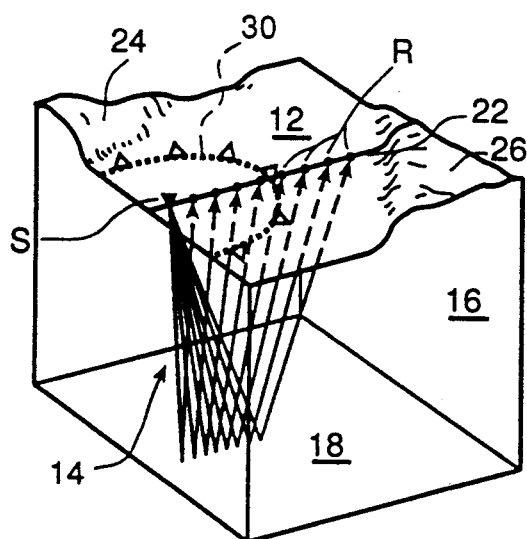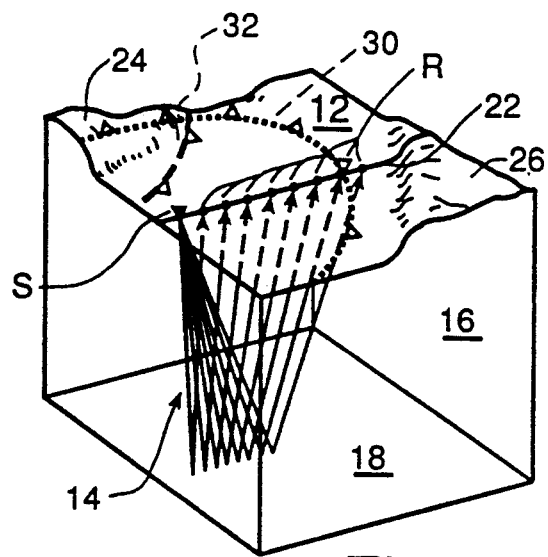
Fig. 1a  Fig. 1b
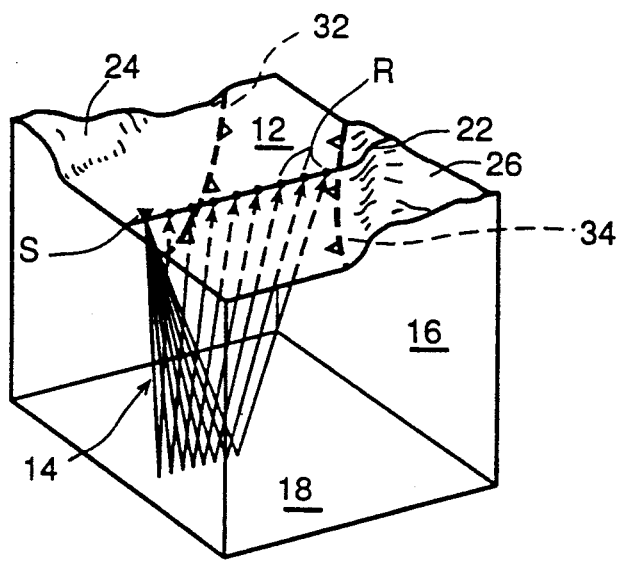
Fig. 1c

IDENTIFYING, CHARACTERIZING, AND MAPPING OF SEISMIC NOISE

BACKGROUND OF THE INVENTION

The present invention relates generally to a method of identifying, characterizing, and mapping seismic noise as an aid in evaluating and enhancing seismic data.

In seismic exploration, seismic noise is an unwanted phenomenon which detracts from the quality, and hence interpretability, of seismic data of interest. Seismic noise exists in two forms, coherent and incoherent seismic noise. Incoherent seismic noise is composed of many frequencies having random phase as contrasted by coherent seismic noise which exhibits a correlation in phase between separate seismic signals.

One type of coherent seismic noise is surface seismic noise. Surface seismic noise takes two principal forms. The first is background or cultural noise. Sources of cultural noise are road traffic, electric power lines, wind or wave noise and the like. Another source of surface seismic noise comes from what are termed scatterers. These are inhomogeneities in the earth's surface or near-surface materials in the area of the seismic survey which cause seismic energy, imparted by a seismic source, to be reflected or refracted in such a fashion as to be recorded in the seismic data. Both forms of surface seismic noise are unwanted because they do not contain information meaningful to the understanding of the earth's subsurface formations. Surface seismic noise can also interfere with or mask interpretation of seismic signals of interest.

SUMMARY OF INVENTION

The present invention provides a new and improved method of identifying, characterizing, and mapping the contributions of seismic noise in seismic data acquired during seismic exploration.

Seismic energy is received at an array of seismic receivers. The array of seismic receivers can be beam steered to sense seismic energy arriving from a particular azimuth. Measures of the strength of the seismic energy sensed can be formed as a function of specified directions or azimuths, velocities, arrival times, and ranges. The measures of the strength of the seismic energy is repeated for a number of specified directions, arrival rates, arrival times, and ranges. Displays of the azimuthal distribution of the strength of the seismic energy as a function of velocity, arrival times, and ranges can then be formed. The displays so formed resemble radar scanning patterns and are found to be helpful in identifying, char acterizing, and attenuating effects of surface seismic noise in seismic data of interest.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIGS. 1a, 1b, and 1c are isometric views of seismic data acquisition of the earth's subsurface;

DETAILED DESCRIPTION OF THE INVENTION

Figure 2:
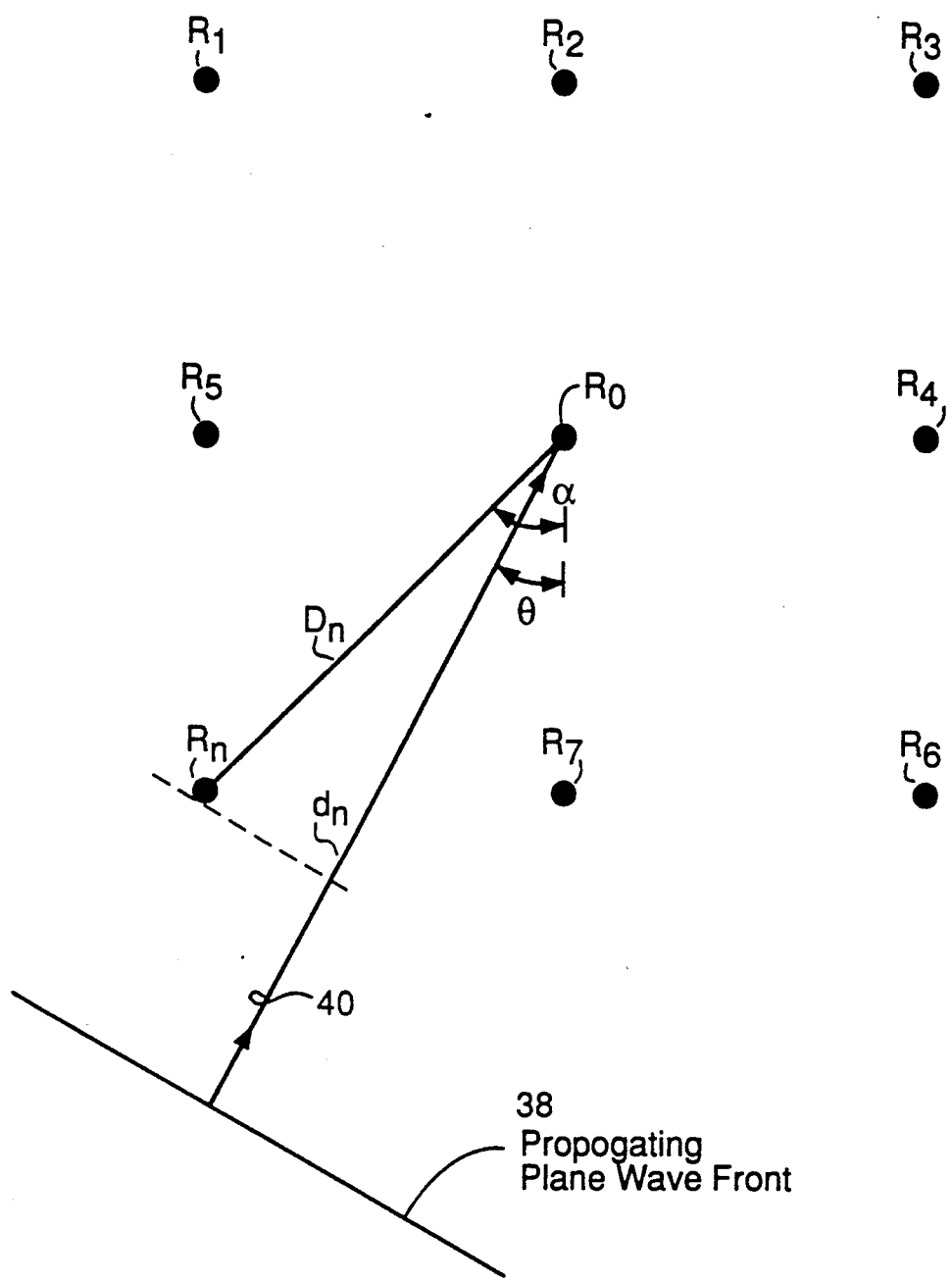
FIG. 2 is a plan view of an areal array of seismic sensors in a seismic survey.

In order to better understand the present invention, the following introductory comments are provided. In the field of radar technology, the concept of a phased array antenna to electronically steer a radar beam without physically rotating the antenna is well known. The application of phased array antennas and beam steering to geophysical exploration to identify, characterize, and map seismic noise in seismic data will now be discussed.

An isometric view of a seismic survey of the earth's subsurface is depicted in FIGS. 1a, 1b, and 1c. A seismic source S located on or near land surface 12 emits seismic energy. Although a land surface 12 is shown, it should be understood that the present invention may be practiced in connection with seismic data acquisition in bodies of water as well.

The seismic energy from the seismic source S propagates by a number of raypaths 14, downwardly through the earth 16. As the seismic energy propagates downwardly, portions of such seismic energy are reflected by one or more reflective surfaces, one of which is indicated at 18. The seismic energy reflected from surfaces, such as 18, propagates upwardly from the subsurface formations by raypaths 14 to a number of receivers or sensors R displaced along a seismic line of profile 22 according to the type of sensor array specified for the survey in question.

Since the earth's land surface 12 is not normally flat or smooth, this example includes raised portions or hills indicated at 24 and 26. These raised portions 24 and 26 can serve as surface scatterers, causing the generation of unwanted surface scattered noise in seismic data of interest.

Each time the source S emits seismic energy, a portion of this seismic energy propagates as a radially expanding surface wave 30 (FIG. 1a) along the earth's surface 12. The seismic energy in the surface wave 30 can be sensed on its arrival at each of the receivers or sensors R and is generally referred to as a direct arrival surface wave.

At some time, the horizontally travelling surface wave 30 encounters the raised earth body 24 and a portion of the surface wave 30 is scattered or reflected, as indicated by horizontally travelling wave front 32 (FIG. 1b). In a similar manner, the surface wave 30 subsequently encounters the raised earthen body 26 and a portion of the surface wave 30 is reflected or scattered as indicated by a horizontally travelling wave front 34 (FIG. 1c). Such scattered seismic energy (32, 34) does not provide the explorationist useful information about subsurface formations of interest and is generally referred to as a surface scattered noise.

The seismic energy from surface wave 30 reflected or scattered as wave fronts 32 and 34 can be sensed at the sensors R, along with the reflected seismic energy 14 and direct arrival surface waves. Unfortunately, the arrival of wave fronts 32 and 34 from surface scatterers 24 and 26 and direct arrival surface waves can overlap in time the arrival of the reflected seismic energy 18 which represents seismic data of interest. In this way, surface scattered noise as well as direct arrival surface waves can mask or interfere with interpreting the earth's subsurface formations from the reflected seismic energy.

In addition to surface scattered noise resulting from activation of seismic sources, the sensors R can also detect cultural or background noise present in the area of the seismic survey. Examples of cultural or background noise are road traffic, electrical power lines, wind or wave noise, or the like. This type of noise is present and can be detected by the sensors R in the absence of emission of seismic energy from the source S.

While techniques are generally known for compensating for the effect of direct arrival surface waves on seismic data, analyzing and attenuating surface scattered noise and cultural noise remains an extremely difficult task requiring substantial geophysical interpretive skills. According to the present invention, however, surface scattered noise as well as cultural noise can be identified, characterized, and mapped. Once identified, characterized, and mapped, the adverse effects of such surface seismic noise on seismic data can be attenuated so as to enhance the interpretation and evaluation of the earth's subsurface formations.

Turning to FIG. 2, an areal array of seismic receivers $R_0$, $R_1$, $R_2$... $R_n$ centered about receiver $R_0$, having coordinates $x_0$, $y_0$ on the earth's surface 12, is shown. A horizontally travelling plane wave front 38 is depicted as propagating along raypath 40.

The distance $D_n$ from the receiver $R_0$, at the center of the areal, to the nth seismic receiver $R_n$ can be expressed as follows:

$$D_n = ((x_n - x_0)^2 + (y_n - y_0^2))^{\frac{1}{2}} \quad (1)$$

Further, when plane wave front 38 first encounters seismic receiver $R_n$, its distance $d_n$ from the center of the areal array of receivers can be expressed as follows:

$$d_n = D_n \cos(\theta - \alpha) = D_n \cos\theta \cos\alpha + D_n \sin\theta \sin\alpha \quad (2)$$

where $\theta$ and $\alpha$ are the angles shown in FIG. 2. Simplifying the terms of Equation (2) yields the following:

$$d_n = (y_n - y_0)\cos\theta + (x_n - x_0)\sin\theta \quad (3)$$

The travel times $\Delta t_n$ for plane wave 38 traveling between seismic receivers $R_n$ and $R_o$, and propagating along raypath 40 at an apparent velocity v, can be expressed as follows:

$$\Delta t_n = \frac{d_n}{v} \quad (4)$$

A beam formed trace B can be formed from seismic signals or traces $T_n(t)$ recorded at each receiver $R_n$ in the areal array in response to wave front 38 according to the following relationship:

$$B = \Sigma w_n T_n(t - \Delta t_n) \quad (5)$$

where $w_n$ is defined as a spatial weighting factor. The spatial weight factor $w_n$ can be selected from cosine, Chebychev, or fixed weights.

The beam formed trace B is a sum of the traces $T_n(t)$ recorded by the receivers in the areal array which have been time-shifted so as to appear as though wave front 38 propagating along the direction $\theta$ was sensed simultaneously at the center of the areal array. By varying the time-shift applied to each of the traces $T_n(t)$, one can scan through 360° of azimuth. It should be noted that the time shift of Equation (5) is inherently a function of both azimuth and velocity.

The strength of the seismic energy $E_n(v)$ sensed by the areal array of seismic receivers within a time window $t_w$ centered about a selected time $t_i$ and traveling at a plurality of apparent velocities can be characterized as follows:

$$E_n(v) = \left( \sum_{t_i - \frac{t_w}{2}}^{t_i + \frac{t_w}{2}} w_t B^2 \right)^{\frac{1}{2}} \quad (6)$$

where $w_t$ is a temporal weighting factor. The temporal weighting factor $w_t$ can be selected from cosine and fixed weights.

Alternatively, the strength of the seismic energy $E_n(t)$ sensed by the areal array of seismic receivers for a plurality of times t within the time interval $t_1$ to $t_2$ and traveling at a selected apparent velocity can be characterized as follows:

$$E_n(t) = \left( \sum_{t - \frac{t_w}{2}}^{t + \frac{t_w}{2}} w_t B^2 \right)^{\frac{1}{2}} \quad (7)$$

It has also been found that by normalizing the measure of the strength of the seismic energy sensed with a measure of the strength of incoherent seismic energy sensed by the areal array of receivers, one can provide a clearer picture of the coherent scattered and cultural noise in the seismic data. One method of normalization comprises first determining a noise trace N(t) according to:

$$N(t) = \frac{1}{n} \Sigma T_n^2(t) \quad (8)$$

where n is the number of traces recorded by the areal array of receivers.

Thereafter a measure of the strength of the incoherent noise energy $\xi_n(t)$ sensed by the areal array can be obtained according to:

$$\xi_n(t) = (\Sigma w_t N^2(t))^{\frac{1}{2}} \quad (9)$$

where $w_t$ is the temporal weighting factor.

In either case, the normalized strength of the seismic energy sensed by the areal array of receivers represents a measure of the coherent seismic energy recorded in the traces $T_n(t)$. Displays of the azimuthal distribution of the normalized strength of the seismic energy sensed by the areal array obtained from both Equations (6, 7) are considered passive displays since no assumption, other than plane wave propagation, has been made about the source of the seismic energy.

Figure 3:
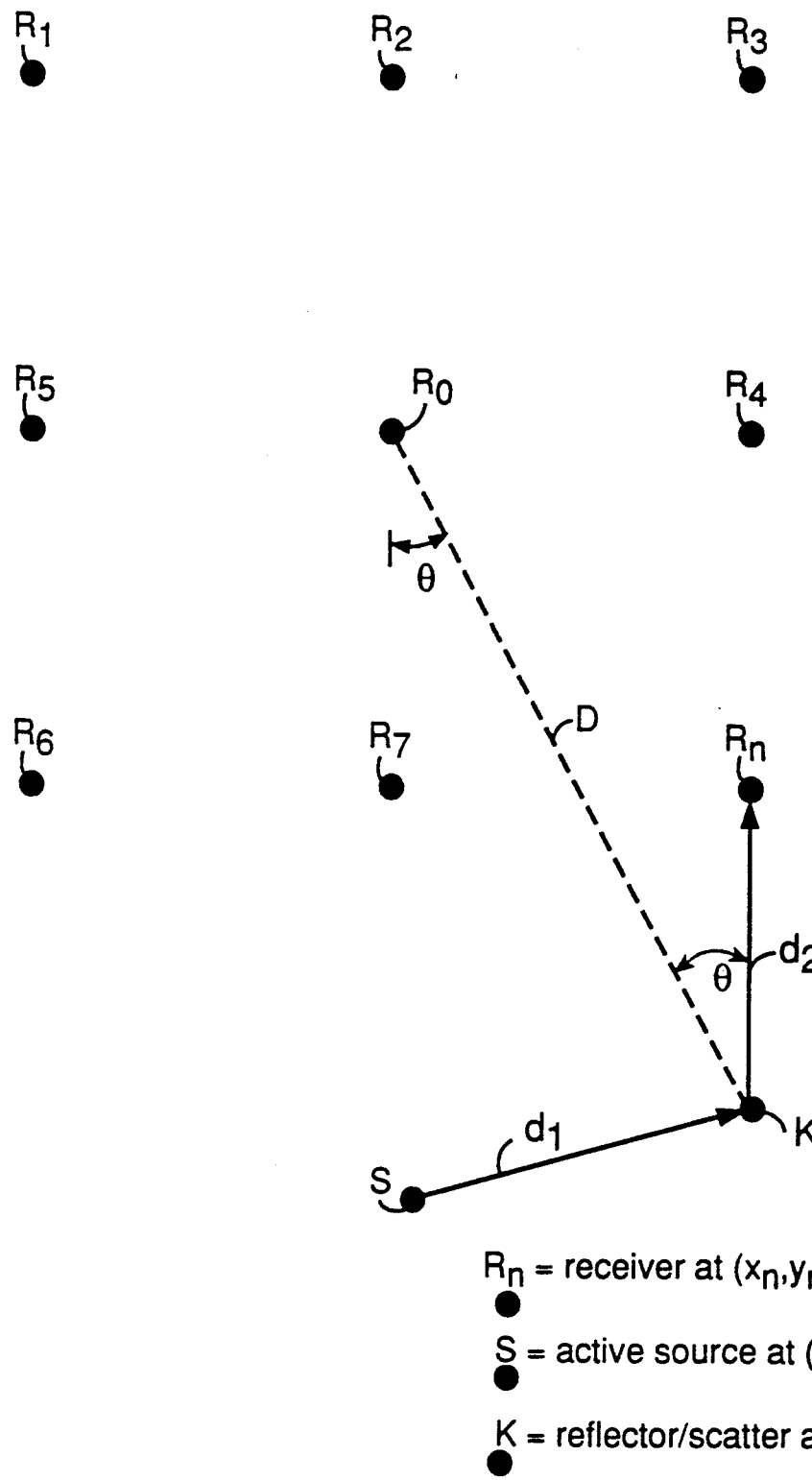
FIG. 3 is a plan view of a seismic source and seismic sensors in an areal array for a seismic survey.

Turning now to FIG. 3, a seismic source S has been added to the areal array of seismic receivers $R_0$, $R_1$, $R_2...R_n$ with the center of the areal array being located at coordinates $x_0$, $y_0$; the seismic source S being located at coordinates $x_s$, $y_s$ and a surface or near surface reflector or scatterer K being located at coordinates $x_k$, $y_k$. The x, y coordinates of the surface or near surface reflector K with respect to the center of the areal array can be characterized as follows:

$$x_k = D \sin \theta \qquad (10)$$

$$y_k = D \cos \theta \qquad (11)$$

where D is the distance from the center of the areal array to the reflector K; and $\theta$ is the angle depicted in FIG. 3

The horizontal distance $d_1$ from the surface scatterer K to the seismic source S can be expressed as follows:

$$d_1 = ((x_k - x_s)^2 + (y_k - y_s)^2)^{\frac{1}{2}} \qquad (12)$$

Similarly, the horizontal distance $d_2$ from the surface scatter K to the seismic receiver $R_n$ can be expressed as follows:

$$d_2 = ((x_n - x_k)^2 + (y_n - y_k)^2)^{\frac{1}{2}} \qquad (13)$$

The time delay $\Delta t_n$ between the initiation of seismic source S and the arrival of seismic energy scattered from the surface or near surface reflector K at seismic receiver $R_n$ can be expressed as follows:

$$\Delta t_n = t_0 + \left( \frac{d_1}{v} + \frac{d_2}{v} \right) \qquad (14)$$

where the seismic energy is propagating at an apparent velocity v.

In the foregoing Equation (14), $t_0$ is defined to be the zero offset intercept time for linear moveout of a seismic event. Another way of describing the zero offset intercept time $t_0$ is the normal incident two-way travel time for the seismic energy to propagate down to and back from the near surface reflector K.

A beam formed trace B can be formed from the seismic signals or traces $T_n(t)$ recorded at each seismic receiver in the areal array, in response to the seismic energy reflected from scatter K, according to the following relationship:

$$B = \Sigma w_n T_n (t + \Delta t_n) \qquad (15)$$

where $w_n$ is a spatial weighting factor. The spatial weighting factor $w_n$ can be selected from the including: cosine, Chebychev, and fixed weights.

The beam formed trace B thus represents the sum of all traces $T_n(t)$ recorded by the seismic receivers in the areal array in response to seismic energy reflected from scatter K, as depicted in FIG. 3, and which have been time-shifted so as to appear as though the scattered energy from scatter K was recorded simultaneously at the center of the areal array. By varying the time-shift applied to each of the traces $T_n(t)$, one can scan through 360° of azimuth. It should be noted that the time-shift of Equation (15) is inherently a function of both azimuth and velocity.

The strength of the scattered seismic energy $E_n(D)$ sensed during a time window $t_w$ centered about a selected time at $t_i$ from surface reflector K at a distance D from the center of the areal array and propagating with an apparent velocity can then be determined according to the following relationship:

$$E_n(D) = \left( \sum_{t_i - \frac{t_w}{2}}^{t_i + \frac{t_w}{2}} w_t B^2 \right)^{\frac{1}{2}} \qquad (16)$$

where $w_t$ is a temporal weighting factor. The temporal weight factor $w_t$ can be selected from the group including cosine and fixed weights.

As discussed earlier with passive displays, the strength of the seismic energy sensed by the areal array of receivers in response to seismic energy emitted by a source can also be normalized with a measure of the incoherent noise to a given measure of the strength of the coherent seismic energy sensed by the areal array of receivers. Displays of the azimuthal distribution of the strength of seismic energy sensed by the areal array in Equation (16) are considered active displays because the nature and location of the receivers and source of seismic energy is known.

Figure 4A:
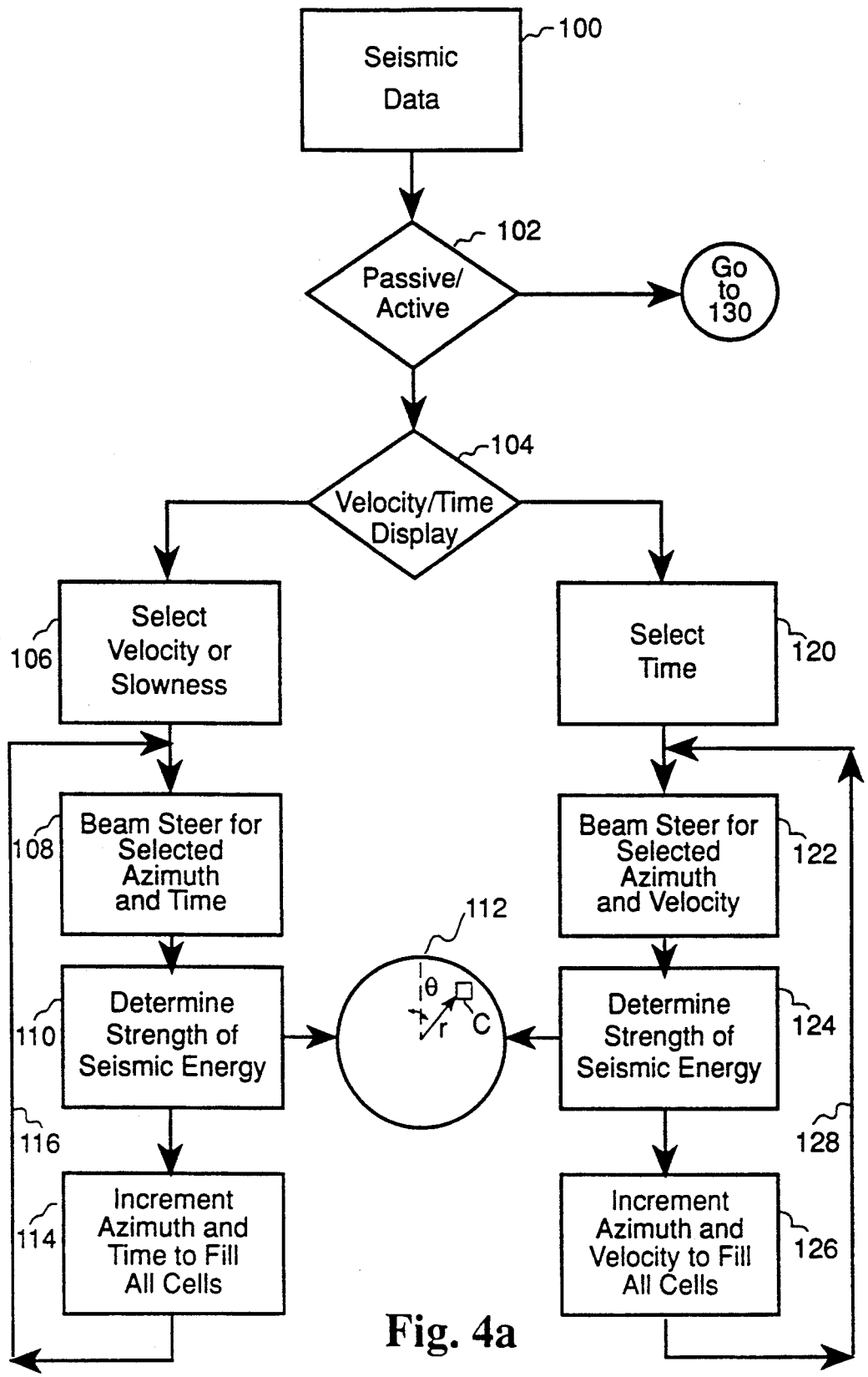
FIGS. 4a and 4b are process flow diagrams of the present invention.
Figure 4B:
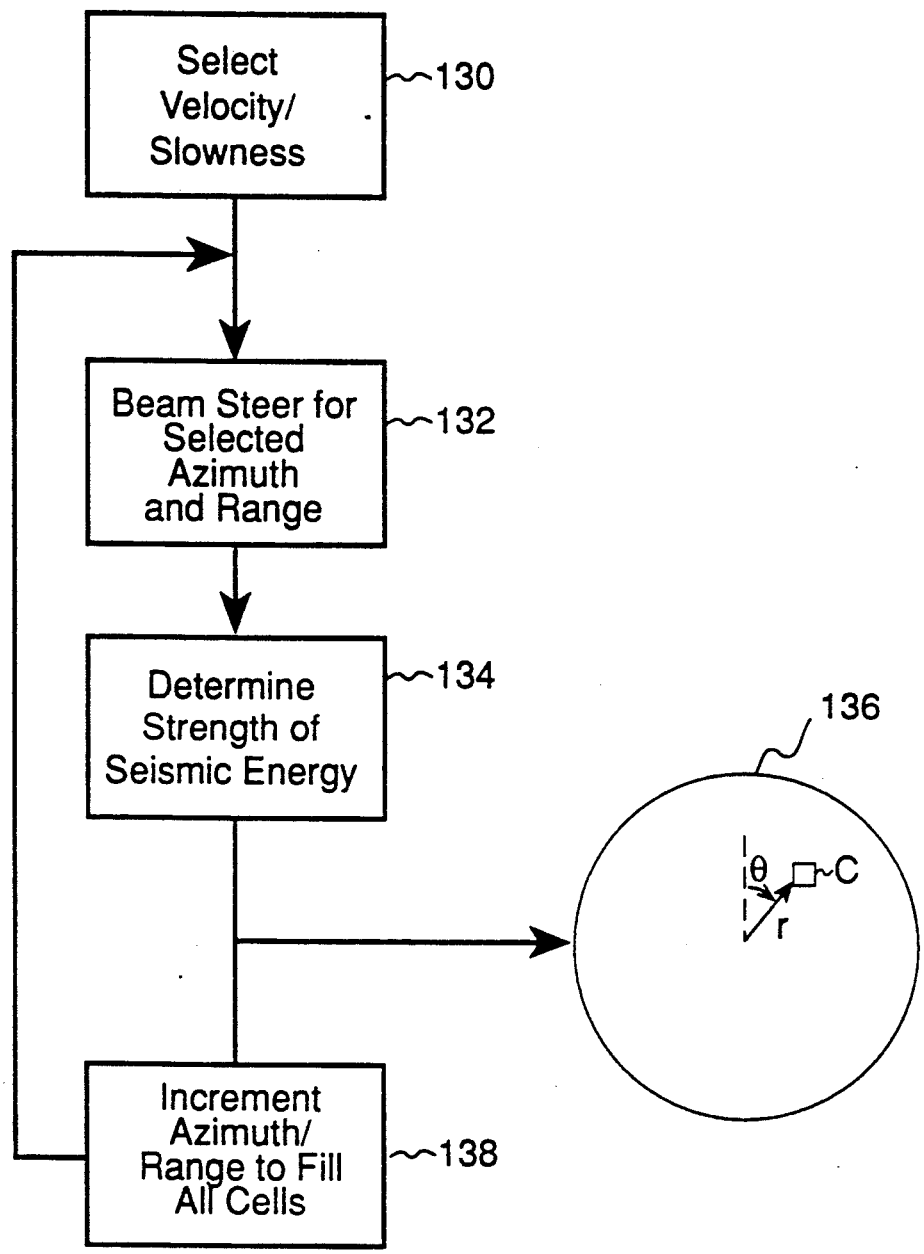

Turning now to FIGS. 4a and 4b, a process flow diagram of the present invention is illustrated. At step 100, seismic data is collected using an areal array of seismic receivers. At step 102, a decision is made as to which method of identification, characterization, and mapping of seismic noise is to be performed. In the event that passive displays are chosen, a decision is made at step 104 as to whether a passive display of the distribution of the strength of the seismic energy sensed as a function of azimuth and time or azimuth and slowness is to be obtained, or both.

For passive displays of the distribution of strength of seismic energy sensed by the areal array of receivers as a function of azimuth and time, a value for apparent velocity or slowness of propagation of the seismic energy is selected at step 106. As used herein, slowness is simply the inverse of velocity. Apparent velocity is the velocity at which the seismic energy appears to travel from one receiver to another in the areal array of receivers. It is understood by those skilled in the art that apparent velocity can be, and often times is, greater than the actual velocity of propagation of seismic energy in the earth.

At step 108 areal array of receivers can be beam steered to sense seismic energy arriving from a particular azimuth, by applying a time shift to the individually recorded seismic signals or traces $T_n(t)$ comprising the seismic data.

At step 110, a measure of the strength of the seismic energy sensed by the areal array of receivers is obtained at a selected time. The measure of the strength of seismic energy sensed can then be displayed at 112. In particular, the measure of the strength of the seismic energy sensed is located on the display in radial coordinates $(\theta, r)$ where $\theta$ represents the direction from the center of the areal array of receivers and r represents a selected time.

Figure 5:
FIG. 5 is a display of the azimuthal distribution of the strength of seismic energy sensed having a range of velocities according to the present invention.

So as to minimize the number of times such determination is made, the area of display 112 can be subdivided into a plurality of cells C having approximately equal area and over which the measure of the strength of seismic energy sensed can be represented by a selected color. By increasing the number of cells C, the resolution of the display improves. Additionally, the colors displayed in adjacent cells can be smoothed by linear interpolating the measure of the strength of the seismic energy. FIG. 5 is exemplary of such a passive display. It has also been found that by normalizing the measure of strength of the seismic energy with a measure of the strength of incoherent seismic energy a clearer picture of the coherent scattered and cultural noise in the seismic data can be achieved.

Having thus determined a normalized value of the strength of the coherent seismic energy for a selected cell C at step 112, at step 114 the areal array of receivers can be beam steered to another azimuth or time by varying the time-shift applied to the seismic signals through control line 116 so as to repeat steps 108–112 and fill in all of the cells C in display 112 and thus produce a display of the azimuthal distribution of the strength of the seismic energy sensed by the areal array. After having viewed a completed display, the explorationist can repeat the entire sequence of steps by selecting a new apparent velocity or slowness at step 106 so as to consider a range of velocities.

Returning now to decision step 104, a decision to produce a passive display of the distribution of the strength of the seismic energy sensed by the areal array of receivers as a function as azimuth and apparent velocity or slowness can be made. At step 120, the explorationist selects a time in the seismic data he desires to analyze. At step 122, the seismic signals $T_n(t)$ are beam steered for selected azimuth and apparent velocity or slowness. At step 124, a measure of the strength of the seismic energy sensed by the areal array of receivers is determined. This measure can be normalized with a measure of the strength of incoherent noise in the seismic data to provide a measure of the strength of coherent seismic noise as previously discussed. The measure strength of seismic energy sensed is located on display 112 in radial coordinates $(\theta, r)$ where $\theta$ represents azimuth and r represents slowness.

Figure 6:
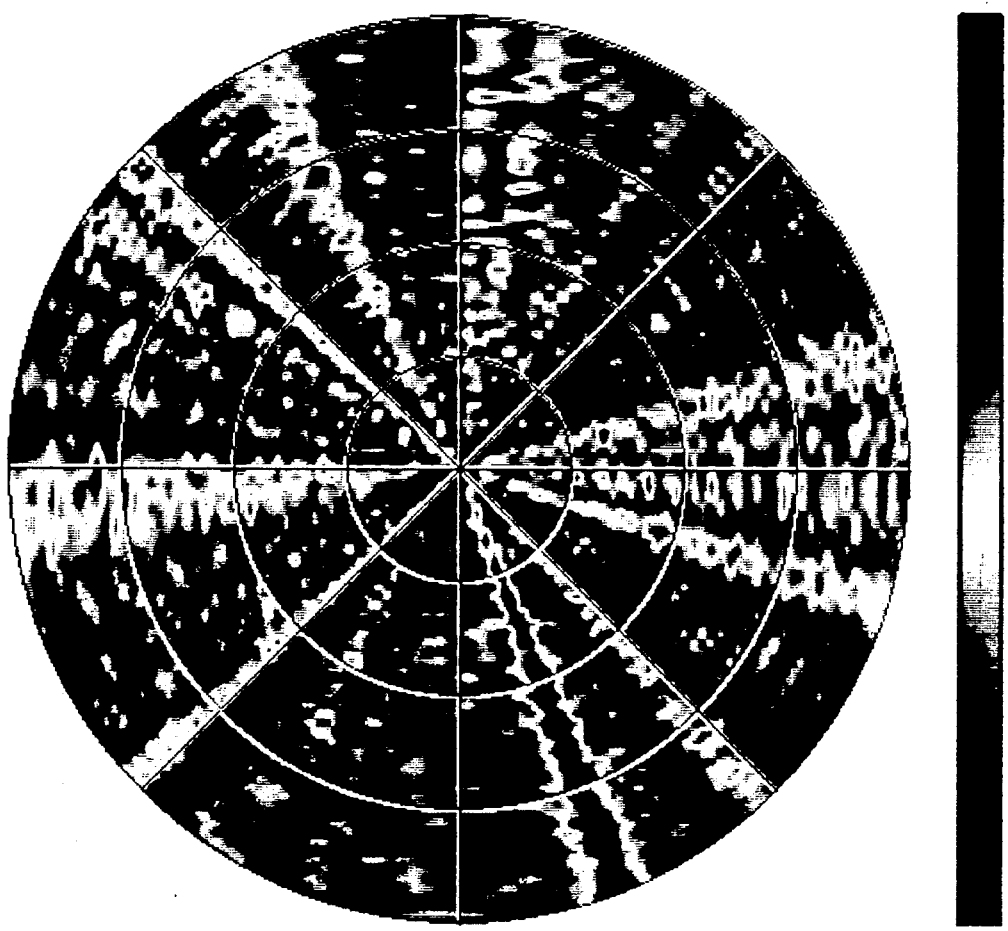
FIG. 6 is a display of the azimuthal distribution of the strength of seismic energy sensed during a specified time interval according to the present invention.

So as to minimize the number of times such determination is made, the area of display 112 can be subdivided into a plurality of cells C having approximately equal area and over which the measure of the strength of seismic energy sensed can be represented by a selected color. Additionally, changes in colors, and hence the strength of seismic energy, between object codes can be smoothed by linear interpolation. FIG. 6 is exemplary of such a passive display.

Having thus determined a normalized value of the strength of the coherent seismic energy at step 124, at step 126 the seismic energy can be beam steered to another azimuth or velocity by varying the time-shift through control line 128 so as to repeat steps 122–124 and fill in all of the cells C in display 112. After having viewed a completed display, the explorationist can repeat the entire sequence of steps for a new time at step 120.

In the event that a decision is made to produce an active display of the strength of the seismic energy sensed by the areal array, control is transferred to step 130. At step 130, an apparent velocity or slowness and zero offset intercept time are selected. Preferably, such velocity can be determined from either or both of the previous passive displays. Thereafter, at step 132 the seismic energy can be beam steered by time-shifting the seismic signals $T_n(t)$ for a selected velocity and zero offset intercept time. At step 134 a measure of the strength of the seismic energy sensed by the areal array of the receivers is made for a window of time centered about a specified time. The strength of the seismic energy sensed is then mapped in display 136 using radial coordinates $(\theta, r)$ where $\theta$ represents direction from the center of the areal array and r represents distance.

Figure 9:
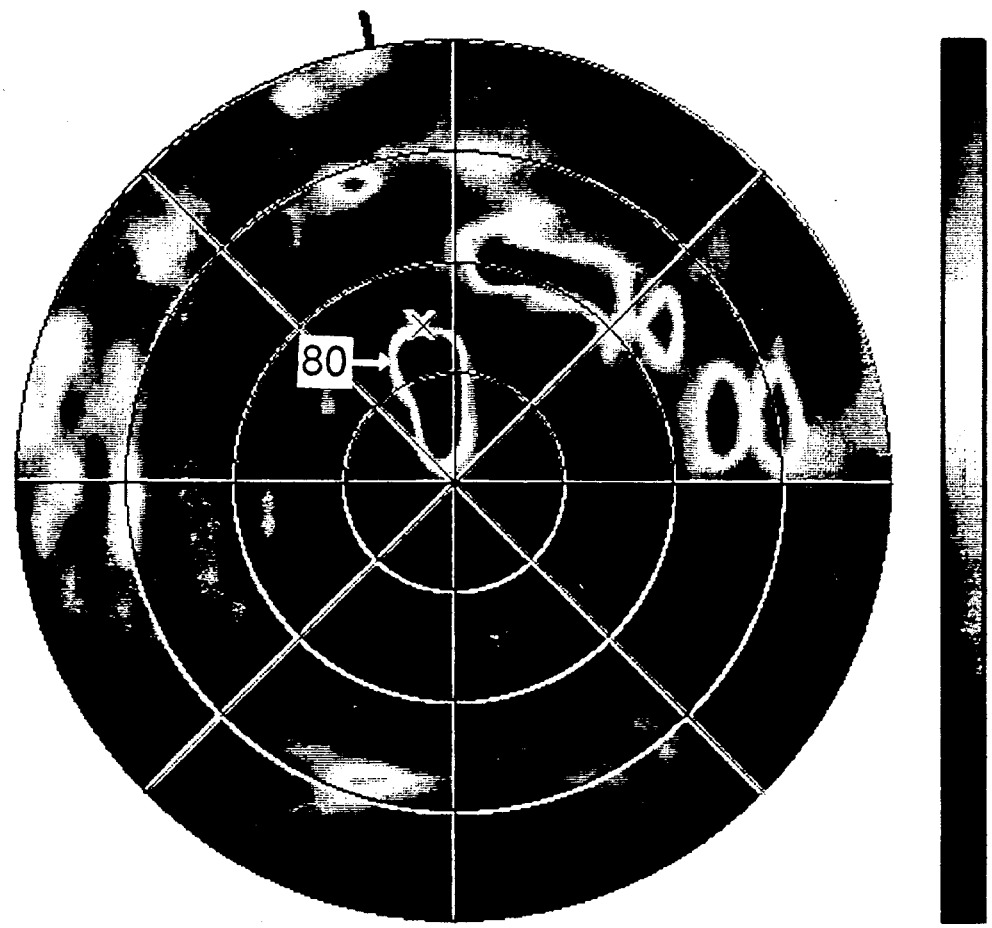
FIG. 9 is a display of the azimuthal distribution of the strength of scattered seismic energy as a function of range according to the present invention.

So as to minimize the number of times such determination is made, the area of display 136 can be subdivided into a plurality of cells C having an approximately equal area and over which the measure of strengths of the seismic energy sensed can be represented by selected color. By increasing the number of cells C the resolution of the display improves. Additionally, changes in color, and hence strength of seismic energy, between adjacent cells can be smoothed by linear interpolation. FIG. 9 is exemplary of such active display. It has also been found that normalizing the measure of strength of seismic energy with a measure of strength of incoherent seismic energy provides a clearer picture of the coherent scattered and cultural noise in the seismic data.

Having thus determined the normalized value of the strength of the coherent seismic energy for a selected cell C at step 136, at step 138 the seismic energy can be beam steered to another azimuth or range by varying the time-shift so as to fill in all the cells of display 136. After reviewing the completed display, the entire sequence can be repeated by selecting a new velocity and zero offset time at step 130.

Evaluating the strength of the recorded seismic energy in both active and passive displays can give an indication as to whether or not the arriving seismic energy is cultural noise or scattered noise and at what strength this seismic energy exists relative a desired reflection. Using this information a geophysicist is able to attenuate such unwanted surface seismic noise or better identify events in the seismic data related to reflection of seismic energy from subsurface formations. In particular if road or traffic noise is present as cultural noise, this noise would be changing in direction in the various displays formed. Other types of background noise would tend to be constant in time throughout a record even in the absence of a source of seismic energy.

Analyzing active displays over a variety of source locations can provide information on the surface scatterers in the area. As the source moves, the surface scatterer will be illuminated from varying angles and ranges, thus providing a more consistent image of the scatterer and not just the scattered noise itself. The actual scatterers remain constant for a fixed areal array as the source moves. Additionally, movie-like displays of both active and passive displays can be produced to provide the explorationist with additional information.

VELOCITY FIELD

FIG. 5 depicts an azimuthal distribution of the strength of the seismic energy sensed for a range of slowness's (radial distance from the center of the display represents decreasing velocity) and various directions or azimuths from the center of the areal array of seismic receivers. In particular, FIG. 5 displays the strength of seismic energy sensed by the areal array of receivers within a time window of 100 msec centered about a selected time of 1450 msec. Only apparent velocities greater than 5,000 f/s were considered in this example. A small tick mark at the perimeter of the display at around 353° indicates the direction of the source from the center of the areal array of seismic receivers. The display area FIG. 5 was subdivided into 961 cells. The temporal weighting factor was cosine and the spatial weighting factor was 1.

The color coding represents the strengths of the sensed seismic energy from low-blue to high-brown. About the perimeter of such display are shown several events representing high strength levels of seismic energy (i.e., colors of yellow and brown) having apparent velocities of ~6,700 f/s. The received surface seismic noise displayed in FIG. 5 is predominantly at one velocity (the surface wave velocity) but comes from many different directions. The outer events have been evaluated as ground roll (a form of surface noise).

Near the center of the display appears an event 50 having a very large apparent velocity. This event has been evaluated as a primary reflection of seismic energy from a subsurface formation. One first notices that it is not exactly in line with the source. This represents distortion caused by noise effects or it may actually be indicative of dip in the reflector. Additionally, the color coding indicates that the strength of the seismic energy from the reflector is about 24db below the noise sensed at the same time.

TIME FIELD

FIG. 6 depicts an azimuthal distribution of the seismic energy sensed by the areal array as a function of time and azimuth for an assumed apparent velocity of 1,750 f/s. In this display, time increases radially outward from 0 to 2,000 msec. Evaluating seismic noise on a time field display provides a method for distinguishing scattered noise from cultural noise. In particular, cultural noise appears to be steady state or slowly changing in direction radial spokes and can be seen to be received from several directions. Additionally, the display area of the FIG. 6 was subdivided into 10,000 cells and a temporal weighting factor was cosine and a spatial weighting factor was 1.

Figure 7:
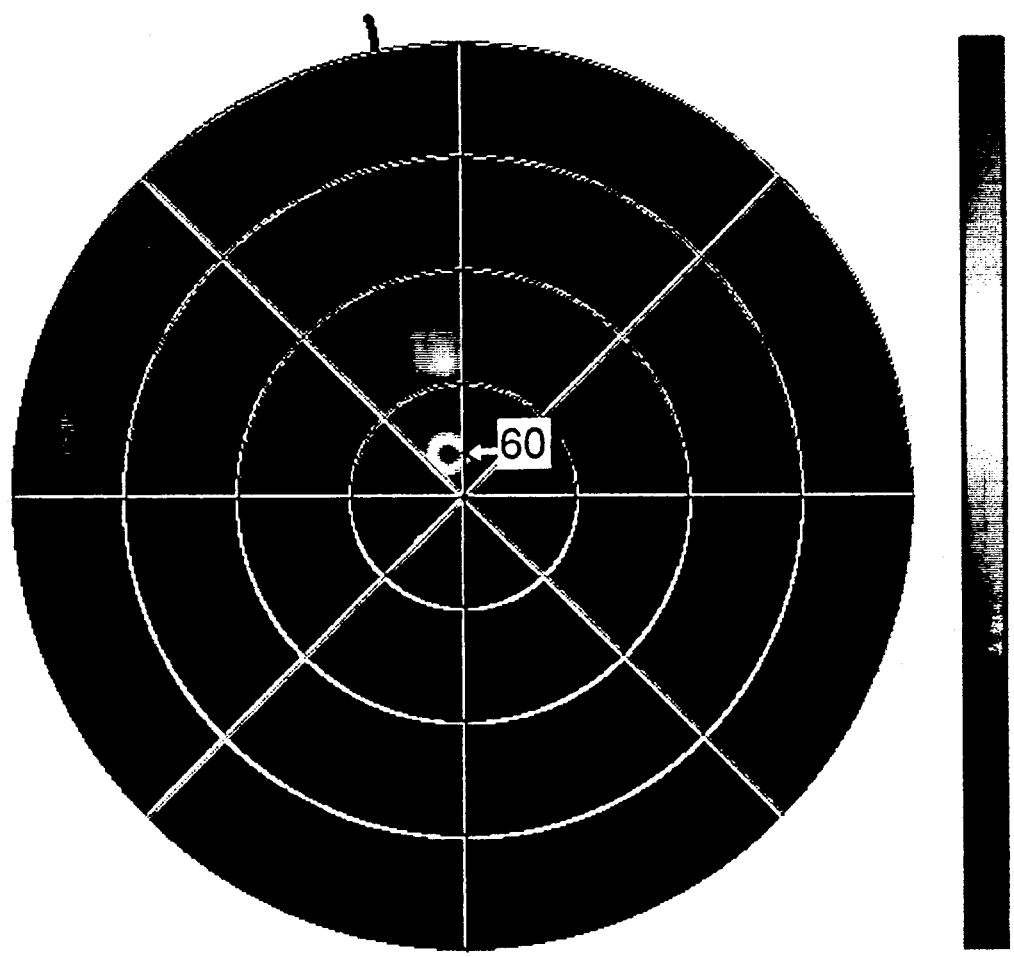
FIG. 7 is a display of the azimuthal distribution of the strength of seismic energy sensed during a specified time interval formed according to the present invention.

Another example is shown in FIG. 7. This display shows the distribution of the strength of seismic energy sensed by the areal array as a function of time and azimuth. An assumed apparent velocity of 12,000 f/s was used in this example. A strong direct arrival wave 60 is clearly visible. The direction of the source from the center of the areal array is indicated by the tick mark at 353°.

Figure 8:
FIG. 8 is a display of the data in FIG. 7 using a different fixed velocity formed according to the present invention.

By way of comparison one can look at FIG. 8, which is the same data of FIG. 7 but reprocessed at a slower velocity of 6,800 f/s. The direct arrival surface energy 70 now arrives later in time than the direct arrival 60 as seen in FIG. 7. As time progresses many strong surface waves are depicted about the perimeter of the display. If this is really scattered seismic noise, a scattered range display would help verify this.

RANGE FIELD

Knowing the apparent source/receiver positions and assuming an apparent velocity (for example, surface velocity measured directly from FIGS. 7 and 8), time delays to and from any point scatterer can be calculated and applied to map out the actual range and azimuth to the scatterer. This is exactly what is done for the example in FIG. 9 which represents an azimuthal distribution of the strength of the seismic energy sensed by the areal array as a function of distance from the center of the areal array.

In particular, the seismic data in FIG. 9 is the same seismic data of FIGS. 7 and 8. The distribution of strength of the seismic energy sensed is shown for different scatter ranges (0 at the center to 8,000 feet at the perimeter of the circle). The scattered energy in this example is calculated from using an apparent velocity of 6,800 f/s and an intercept time of zero msec. The number of cells in this display is 961. Temporal weighting factors and spatial weighting factors employed in this figure were 1.

Since this display represents actual surface position, the location of the source is indicated by "X" half way up from the center. Dominating direct arrival energy 80 can be seen between the source and the center of the display. However, many strong scatterers can be seen northeast and southwest of the areal array. These correspond in direction and range to the edge of the two bounding canyons in the area.

While the present invention has been described in specific steps, it is contemplated that those skilled in the art may substitute additional or modified steps without departing from the scope of the invention which is limited only by the appended claims.

I claim:

1. A method of identifying, characterizing and mapping the contributions of seismic noise in seismic data, comprising the steps of:
    (a) receiving seismic energy at an array of seismic receivers;
    (b) beam steering the array of seismic receivers to sense seismic energy arriving from a specified direction of arrival;
    (c) forming a measure of the strength of the seismic energy arriving for a number of specified directions of arrival;
    (d) mapping the azimuthal distribution of the strength of seismic energy onto a display as a function of direction; and
    (e) identifying and characterizing seismic noise in the seismic data from said display.

2. The method of claim 1, wherein the step of beam steering seismic energy further includes:
    beam steering the seismic array of seismic receivers at each of several specified velocities for a specified direction of arrival.

3. The method of claim 1, wherein the step of beam steering seismic energy further includes:
    beam steering the seismic array of seismic receivers at each of several specified times for a specified direction of arrival.

4. The method of claim 1, wherein the step of forming a measure of the seismic energy arriving further includes:
    normalizing the strength of the seismic energy arriving with a measure of incoherent seismic energy arriving at the array of seismic receivers.

5. The method of claim 1, wherein the step of characterizing the seismic noise includes:
    obtaining a measure representative of the arriving seismic energy selected from the group including velocity, time of arrival, azimuth, distance from the array of seismic receivers, and strength of seismic energy sensed.

6. The method of claim 1, wherein the step of beam steering the array of seismic receivers comprises the step of:

time-shifting seismic signals representative of the seismic energy arriving at the array of seismic receivers.

7. The method of claim 6, wherein the step of beam steering the array of seismic receivers, further comprises the step of:

spatially weighting the time-shifted seismic signals.

8. The method of claim 7, wherein the step of beam steering the array of seismic receivers further comprises the step of:

stacking the spatially weighted time-shifted seismic signals.

9. The method of claim 5, wherein the step of identifying the seismic noise in the seismic energy comprises the step of:

identifying the seismic noise as surface seismic noise selected from the group including cultural noise and scattered noise.

10. The method of claim 1, wherein the step of beam steering the array of seismic receivers further includes:

beam steering the array of seismic receivers for each of several specified distances from the areal array for a specified direction of arrival.

11. The method of claim 1, wherein the step of receiving comprises:

receiving seismic energy in the absence of emission of seismic energy from a seismic source.

12. The method of claim 1, wherein the step of receiving comprises:

receiving seismic energy returned in response to emission of seismic energy from a seismic source.

13. The method of claim 1, further including the step of:

determining velocity of travel of the arriving seismic energy.

14. The method of claim 1, further including the step of:

determining time of arrival of the arriving seismic energy.

15. The method of claim 1, wherein, the step of forming a measure of the seismic energy arriving comprises:

forming a measure of the seismic energy arriving at the array of seismic receivers from a specified direction and at a specified velocity.

16. The method of claim 1, wherein the step of forming a measure of the seismic energy arriving comprises:

forming a measure of the seismic energy arriving at the array of seismic receivers from a specified direction and at a specified time of arrival of the seismic energy.

17. The method of claim 1, where the step of forming a measure of the seismic energy arriving comprises:

forming a measure of the seismic energy arriving at the array of seismic receivers from a specified direction and at a specified distance from the array of seismic receivers.

18. The method of claim 1, wherein step (a) is performed in the absence of seismic energy emitted from a seismic source.

19. The method of claim 1, wherein step (a) is preceded by the step of emitting seismic energy from a seismic source.

* * * * *